United States Patent [19]

Austin

[11] Patent Number: 5,216,920

[45] Date of Patent: Jun. 8, 1993

[54] MULTIFOLD SHIPBOARD GRAVITY UPGRADED WITH STILL READINGS

[76] Inventor: Charles T. Austin, 10333 Westoffice Dr., Houston, Tex. 77042

[21] Appl. No.: 833,948

[22] Filed: Feb. 11, 1992

[51] Int. Cl.$^5$ ............................................. G01V 7/02
[52] U.S. Cl. ................................................. 73/382 R
[58] Field of Search ..................... 73/382 R, 382 G; 364/443, 448, 457

[56] References Cited

U.S. PATENT DOCUMENTS

| | | | |
|---|---|---|---|
| 4,550,601 | 11/1985 | Evans | 73/382 R |
| 4,692,869 | 9/1987 | King et al. | 364/448 |
| 4,809,545 | 3/1989 | Lyle | 73/382 R |
| 4,910,674 | 3/1990 | Lerche | 364/443 |
| 4,939,663 | 7/1990 | Baird | 364/443 |
| 5,001,634 | 3/1991 | Nordlin | 73/382 G |
| 5,014,205 | 5/1991 | Sindlinger et al. | 364/443 |
| 5,087,916 | 2/1992 | Metzdorff et al. | 364/443 |

Primary Examiner—Hezron E. Williams
Assistant Examiner—Michael Brock

[57] ABSTRACT

Shipboard gravity data are currently recorded with one shipboard gravity meter. Gravity data are tied to the international gravity datum when the boat docks about every 30 days. The accuracy of these data is about 0.5 milligals and not sufficiently accurate for detailed quantitative interpretation. It is possible to increase the accuracy of shipboard gravity data twofold by using the procedure we have described. A stable boat with precision navigation and water depth soundings is necessary. Two gravity meters are calibrated to read the same values and times. These are placed near the center of the boat with one meter facing forward and one facing backward for plus and minus cross coupling, or simultaneous accelerations in different directions. Integration of the gravity recordings cancels random noise. This innovation increases the accuracy to 0.35 milligals. Shipboard gravity data are tied to a coarser grid of still gravity readings tied to the international gravity datum at land locations. The boat is stopped and still gravity readings are recorded at sea, forming the coarse grid of data. The still readings are recorded in loops combined with continuous base gravity recordings on land for diurnal control. The accuracy of the still gravity values is about 0.15 milligals. The shipboard gravity data are tied to the still gravity data grid at time intervals of 30 minutes versus the normal 30 days. The resulting gravity data are accurate to about 0.25 milligals and adequate for detailed studies.

5 Claims, 1 Drawing Sheet

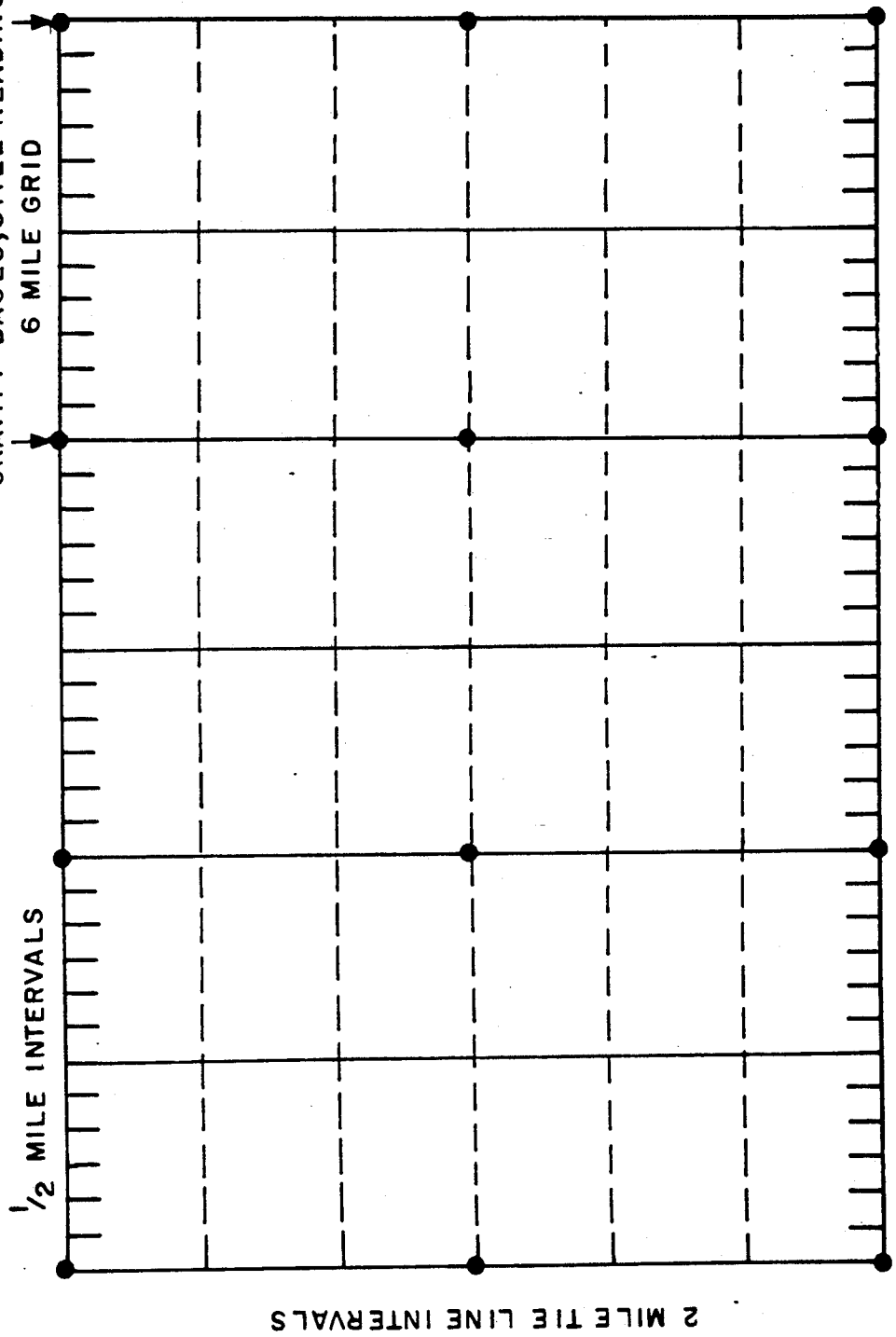

MULTIFOLD SHIPBOARD GRAVITY UPGRADED WITH STILL READINGS

THE BACKGROUND

The present procedure for recording shipboard gravity data has been to use a single shipboard gravity meter. The shipboard gravity meter is essentially the same as a land gravity meter, except provisions are made to keep the meter level while in a marine mode and corrections must be made for the movement of the boat. Eotvos Corrections must be calculated from the navigation data to account for changes in the gravity readings caused by course and velocity changes of the recording boat.

The object of our invention is to improve the recording of the shipboard gravity data by using two gravity meters. Both meters are placed near the center of gravity or mass in the recording vessel with one meter faced forward, which is the customary direction, and one meter faced toward the stern (the back of the boat). This has the effect of recording plus cross coupling from one meter versus minus cross coupling from the other meter, or simultaneous accelerations in two different directions. The integration of the two gravity recordings cancels random noise and improves the quality of the gravity data. This is necessary in order to take advantage of new sophisticated computer applications in interpretation.

These data are normally tied to absolute gravity values at International Gravity Bases located at ports of call at about one month intervals. There is a need to increase the frequency of the base ties which increases the accuracy of the shipboard gravity data, in addition to using two gravity meters.

The customary procedure for tying the marine gravity survey to the International Gravity Base Network is to take a still gravity reading with the shipboard gravity meter at a port that has an established international gravity base value. The difference between the still gravity reading taken with the shipboard gravity meter on the boat and the international gravity value is applied to the shipboard gravity readings to place these values on the international gravity datum.

As a general rule the boat returns to this port, or another port that has an established international gravity base value, within 30 days. If the gravity tie is made to another base, the difference between the two international gravity bases is simply applied to the original base which makes it the same as making both ties to the original base. At that time a repeat still gravity reading is recorded with the shipboard gravity meter at the gravity base. The difference between the gravity value determined at the first tie at the gravity base and the second tie at the gravity base gives the amount of drift, or instrument reading change, and the diurnal change in the gravity field for the time interval between the two base gravity readings. The 30 day period for checking the amount of change in instrument drift and the diurnal change in the gravity field is insufficient for a detailed gravity survey.

Part of our invention to improve shipboard gravity data includes setting up a gravity base network at sea. Part of the new bases at sea are tied directly to the International Gravity Base Network at ports of call. Then a systematic grid of bases is developed at sea. The base values at sea are determined by taking still readings with the shipboard gravity at locations on a regular grid within the area to be recorded in a moving mode by the shipboard gravity meter. The network of gravity bases established at sea are all tied together and any differences above 0.1 milligal are resolved. Before the actual shipboard survey starts, continuous recordings are made down each of the lines of the base grid and these are adjusted to the base network at sea. An appropriate grid for the sea gravity bases is six miles which provides continuous gravity control that is very accurately tied. This now makes it possible to cross a gravity base line approximately every 30 minutes if the regular shipboard survey is conducted at ten miles per hour, or approximately every hour if the survey is conducted at five miles per hour. The gravity diurnal and instrument drift can be corrected more accurately by having the base gravity ties at 30 minutes to one hour versus one month.

The purpose of the Multifold Shipboard Gravity updated with still readings, or bases, is to acquire marine gravity data that is superior to existing marine gravity data.

The proposed procedures will increase the accuracy of the gravity data to about 0.25 milligals from an average of 0.50 milligals or more. Gravity will be recorded using proven methods to increase the accuracy. The procedures described will make the cost higher than a conventional gravity survey to achieve the accuracies sought; however, the high quality data will be worth more than conventional data.

Continuous base gravity readings will also be digitally recorded on land at a base station using a LaCoste & Romberg Geodetic Gravity Meter. This will give a portrayal of the diurnal gravity changes for the area at a stable fixed location. This will also be integrated with the shipboard gravity data when there are significant changes in the diurnal gravity data.

It is necessary to have a very stable boat that has adequate space in the lower part, or center of gravity, for two or more LaCoste & Romberg Air/Sea Gravity Meters. The navigation will be Differential Global Positioning Service using satellite positioning with land station updates. The horizontal accuracy of the positions is three to nine meters when there are sufficient satellites. Recording will be shut down a couple of hours each day when there are few useable satellites. The precision bathymetric system using sound velocity will give bathymetric data accurate to +/− one meter or less. The depths at the still readings will be measured exactly and integrated with other depths for an accuracy of one meter.

The meters will be tuned to read the same values and times. One meter will face the front of the boat and one will face the back of the boat for plus and minus cross coupling, or simultaneous accelerations in two different directions. The gravity from the meters will be integrated to cancel random noise. Our standard marine gravity survey is normally accurate to 0.5 milligals. The meters recording data simultaneously, or multifold gravity will produce shipboard gravity accurate to about 0.35 milligals. The combined shipboard gravity data tied to the grid of still gravity readings will be accurate to about 0.25 milligals.

A three minute bell shaped filter will be appropriate for the gravity data. This will be 0.5 mile width at ten knots and will define gravity anomalies from geologic structure deeper than about 660 feet deep. This filter would not remove anything deeper than 660 feet in water from 600 to over 6,000 feet.

These are the points we have highlighted to improve the accuracy of the gravity data:
1. Closely spaced gravity control
2. Stable research vessel
3. Fully equipped vessel with functioning auxiliary equipment in place
4. Boat crew familiar with area
5. Perfect space for two or more shipboard meters in stable location on vessel
6. Ties to absolute gravity
7. Ties to still gravity readings
8 Still readings in tied loops for gravity meter drift control
9. Base gravity meter to measure diurnal gravity on land
10. Experienced gravity meter operators
11. Recent vintage shipboard gravity meters
12. Gravity meter maintenance
13. Multiple meters
14. Multifold gravity
15. Meter arrangement for maximum random noise cancellation
16. Improved navigation with differential updates
17. Improved bathymetry with sound velocity calibrations
18. Pause in production during sparse satellite control determinations from logs and cores for precise Bouguer correction
20. Experience in acquisition, compilation and interpretation

BRIEF DESCRIPTION OF DRAWING

FIG. 1 illustrates a layout of the gravity still reading locations, or bases, established at sea. The gravity bases are tied together and used to correct the more closely spaced gravity data for diurnal changes and meter drift. The finer grid shown as a "dashed" line is the track of the shipboard data recorded with two marine gravity meters a part of the shipboard gravity survey.

DETAILED DESCRIPTION

The survey used to describe this procedure will have base gravity stations at sea on a six mile by six mile north-south grid throughout the more closely spaced lines of north-south traverses spaced one-half mile apart tied by east-west traverses spaced two miles apart in the actual shipboard gravity survey. The base stations at sea are tied to the International Gravity Base Network established on land with many stations located at airports, courthouses, ports and other places throughout the world. This is done by reading the marine gravity meter at an international base at the dock and then reading the marine gravity meter at one of the base gravity stations at sea. The difference between the two readings may be applied to the base gravity station at sea to obtain an international gravity value at that location. The base gravity locations at sea may be marked with buoys or relocated by the navigation system used for locations at sea. The gravity still readings at sea or the sea bases will be retied to the international gravity bases on land any time the boat returns to port.

After the closest base to the port has been established, the still readings or bases will be taken at six mile intervals in a southerly direction. A loop of base stations will be established by sailing to the east or west six miles, then recording still readings at six mile intervals in a northerly direction, and then returning east or west to the original gravity sea base station. A still gravity reading will be repeated at the original gravity base at sea to complete the loop. This loop of gravity base values will be used to determine the amount of gravity drift between the time the original base was first read and repeated. This amount of drift is then linearly prorated by time throughout the loop. If this base tie is within two to three hours it can be corrected in a linear matter since the diurnal gravity curve has a much broader frequency, usually lasting 12 hours. The still gravity readings will be accurate to about 0.15 milligals.

The network of still gravity readings will be integrated with the shipboard data recorded with one-half mile by two mile traverses. This is accomplished by entering the base values along the traverses recorded by the moving shipboard gravity data with one-half mile by two mile traverses. The shipboard data will be tied to the six by six mile still reading grid every 30 minutes. This can be compared with a normal shipboard survey that is tied to a still reading at a dock at intervals of about a month.

I claim:
1. A method of making a shipboard gravity survey over an area of interest comprising the steps of:
   a) establishing a gravity base network over the area of interest by taking a set of still gravity readings from a ship in such a manner that the locations in which the still gravity readings are taken define points in a grid overlaying the area of interest, and tieing the still gravity readings to the International Gravity Base Network and to each other;
   b) surveying the area of interest by taking a series of shipboard gravity readings while moving over the area of interest in a predetermined manner such that occasionally the location at which a shipboard gravity reading is taken corresponds with the location at which a still gravity reading was taken; and
   c) tieing the shipboard gravity readings to the still gravity readings when the location at which a shipboard gravity reading is taken corresponds with the location at which a still gravity reading was taken.

2. The method of claim 1 in which the step of establishing a gravity base network further comprises the steps of:
   a) tieing an initial still gravity reading taken at an initial location to the absolute gravity value at an International Gravity Base;
   b) establishing still gravity readings at the remainder of the points in the grid while travelling in a loop so that the location of the final still gravity reading taken corresponds with the location at which the initial still gravity reading was taken; and
   c) determining the difference between the initial gravity reading and the final gravity reading and using the difference to correct the other still gravity readings for gravity drift.

3. The method of claim 1 in which the still gravity readings are retied to the International Gravity Base Network whenever the ship returns to an International Gravity Base.

4. The method of claim 1 in which gravity readings are taken on land to measure diurnal variations in gravity and the shipboard gravity readings are corrected for these diurnal variations.

5. The method of claim 1 in which the still gravity readings in the gravity base network are taken at locations approximately 6 miles apart and the series of shipboard gravity readings are taken at approximately half mile intervals along parallel paths which are approximately 2 miles apart.

* * * * *